(12) United States Patent
Okubo

(10) Patent No.: US 11,982,420 B2
(45) Date of Patent: May 14, 2024

(54) VEHICLE LIGHTING

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/262,304

(22) PCT Filed: Jan. 6, 2022

(86) PCT No.: PCT/JP2022/000174
§ 371 (c)(1),
(2) Date: Jul. 20, 2023

(87) PCT Pub. No.: WO2022/158294
PCT Pub. Date: Jul. 28, 2022

(65) Prior Publication Data
US 2024/0093854 A1    Mar. 21, 2024

(30) Foreign Application Priority Data

Jan. 22, 2021 (JP) ................................ 2021-008866

(51) Int. Cl.
*F21S 43/20* (2018.01)
*F21S 43/14* (2018.01)
(Continued)

(52) U.S. Cl.
CPC .............. *F21S 43/26* (2018.01); *F21S 43/14* (2018.01); *F21S 43/40* (2018.01); *F21S 45/47* (2018.01); *F21W 2103/60* (2018.01)

(58) Field of Classification Search
CPC ... B60Q 1/34; B60Q 2400/50; F21W 2103/60
See application file for complete search history.

(56) References Cited

U.S. PATENT DOCUMENTS 10,794,559 B2 * 10/2020 Masuda ................. F21S 41/43
10,928,029 B1 * 2/2021 Woo ....................... F21V 5/008
(Continued)

FOREIGN PATENT DOCUMENTS

JP    2019-192350 A    10/2019

OTHER PUBLICATIONS

International Search Report dated Feb. 22, 2022 in PCT/JP2022/000174 filed on Jan. 6, 2022, 2 pages.

*Primary Examiner* — Eric T Eide
(74) *Attorney, Agent, or Firm* — Oblon, McClelland, Maier & Neustadt, L.L.P.

(57) ABSTRACT

The present invention provides vehicle lighting capable of forming an irradiation pattern with a desired brightness distribution while efficiently utilizing light from light sources. The vehicle lighting includes both the light sources disposed in parallel, a condenser lens that condenses light from the light sources, a light-shielding member provided with an irradiation slit, and a projection lens that projects the light, and forms an irradiation pattern. The incident surface has a curved incident surface section and an annular incident surface section, the condenser lens has a reflective surface that surrounds the curved incident surface section, the first light source is disposed such that a first emitting surface is located on a projection lens optical axis of the projection lens, and the second light source is disposed inside the annular incident surface section such that a second emitting surface does not intersect the projection lens optical axis.

9 Claims, 10 Drawing Sheets

(51) Int. Cl.
*F21S 43/40* (2018.01)
*F21S 45/47* (2018.01)
*F21W 103/60* (2018.01)

(56) References Cited

U.S. PATENT DOCUMENTS

2019/0322209 A1* 10/2019 Sugiyama ................ F21S 43/26
2020/0011501 A1* 1/2020 Kunii ........................ F21V 7/22

* cited by examiner

VEHICLE LIGHTING

TECHNICAL FIELD

The present disclosure relates to vehicle lighting.

BACKGROUND ART

Vehicle lighting is considered to form an irradiation pattern on a road surface around a vehicle (see Patent Literature 1 and the like, for example). In this conventional vehicle lighting, light from a light source is projected through a slit in a shade (light-shielding member) to form an irradiation pattern, so that it is possible to inform a viewer of some intention. In this conventional vehicle lighting, light from the light source is guided to the shade by a light guide, so that it is possible to efficiently utilize the light from the light source.

CITATION LIST

Patent Literature

Patent Literature 1: Japanese Patent Laid-Open No. 2019-192350

SUMMARY OF THE INVENTION

Problems to be Solved by the Invention

However, in the conventional vehicle lighting, the light from the light source is diffused in the light guide to make a light distribution uniform on the shade, and therefore it is difficult to adjust the light distribution on the shade and to make the irradiation pattern to be formed have a desired brightness distribution.

An object of the present disclosure is to provide vehicle lighting capable of forming an irradiation pattern with a desired brightness distribution while efficiently utilizing light from light sources.

Means for Solving the Problem

Vehicle lighting of the present disclosure includes: a first light source and a second light source disposed in parallel; a condenser lens that allows light from each of the first light source and the second light source to enter from an incident surface, and emits and condenses the light from an emission surface; a light-shielding member provided with an irradiation slit through which the light condensed by the condenser lens partially passes; and a projection lens that projects the light which has passed through the light-shielding member, and forms an irradiation pattern, wherein the incident surface has a curved incident surface section facing the first light source and the second light source in a condenser lens optical axis direction in the condenser lens, and an annular incident surface section that surrounds the curved incident surface section, the condenser lens has a reflective surface that surrounds the curved incident surface section, the first light source is disposed such that a first emitting surface is located on a projection lens optical axis of the projection lens, and the second light source is disposed inside the annular incident surface section as viewed in a direction of the projection lens optical axis such that a second emitting surface does not intersect the projection lens optical axis.

Effect of the Invention

According to vehicle lighting of the present disclosure, it is possible to form an irradiation pattern with a desired brightness distribution while efficiently utilizing light from light sources.

MODE FOR CARRYING OUT THE INVENTION

Figure 1:
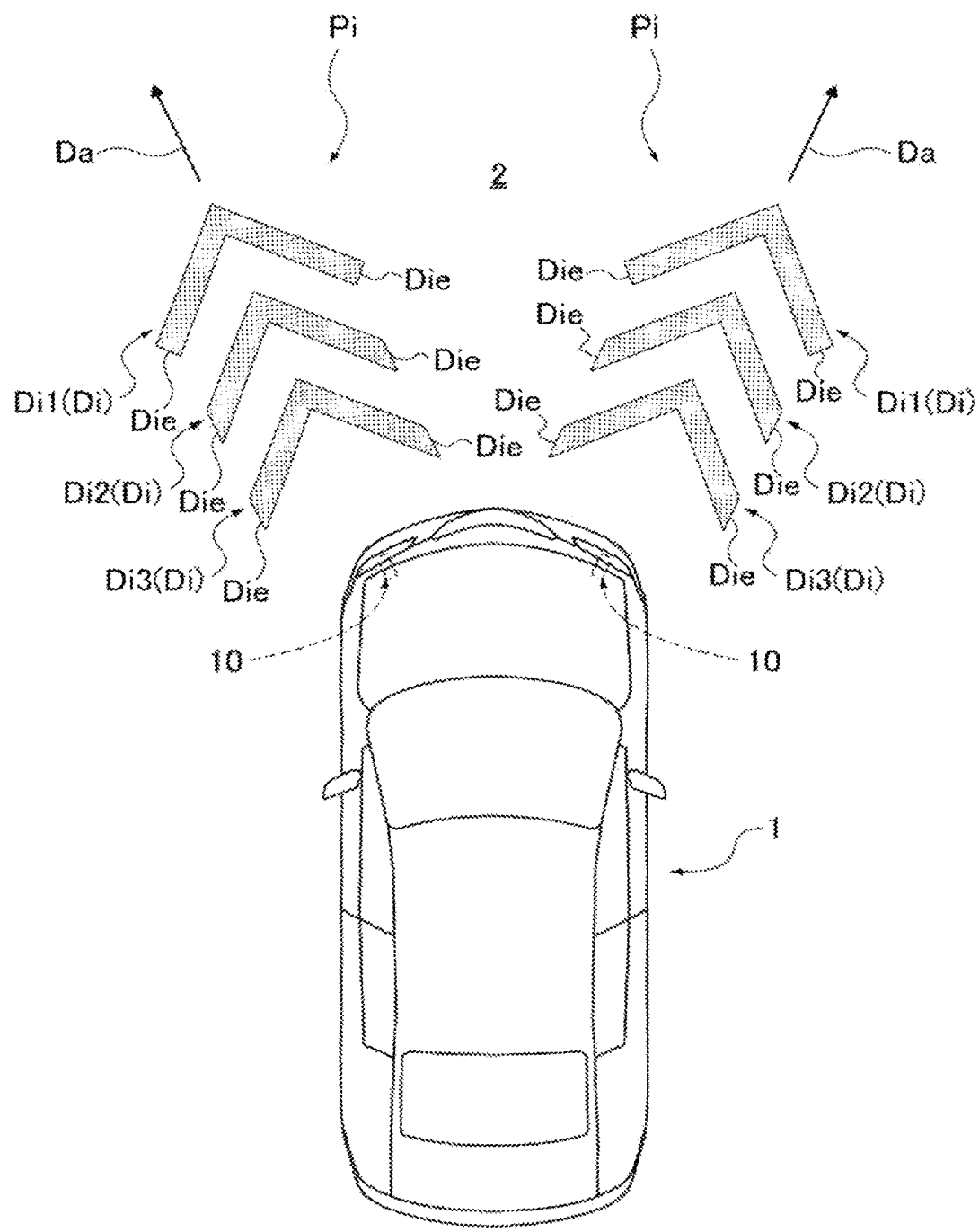
FIG. 1 is an explanatory diagram illustrating a state in which vehicle lighting of Example 1 according to the present disclosure is mounted on a vehicle, and forms each irradiation pattern.
Figure 8:
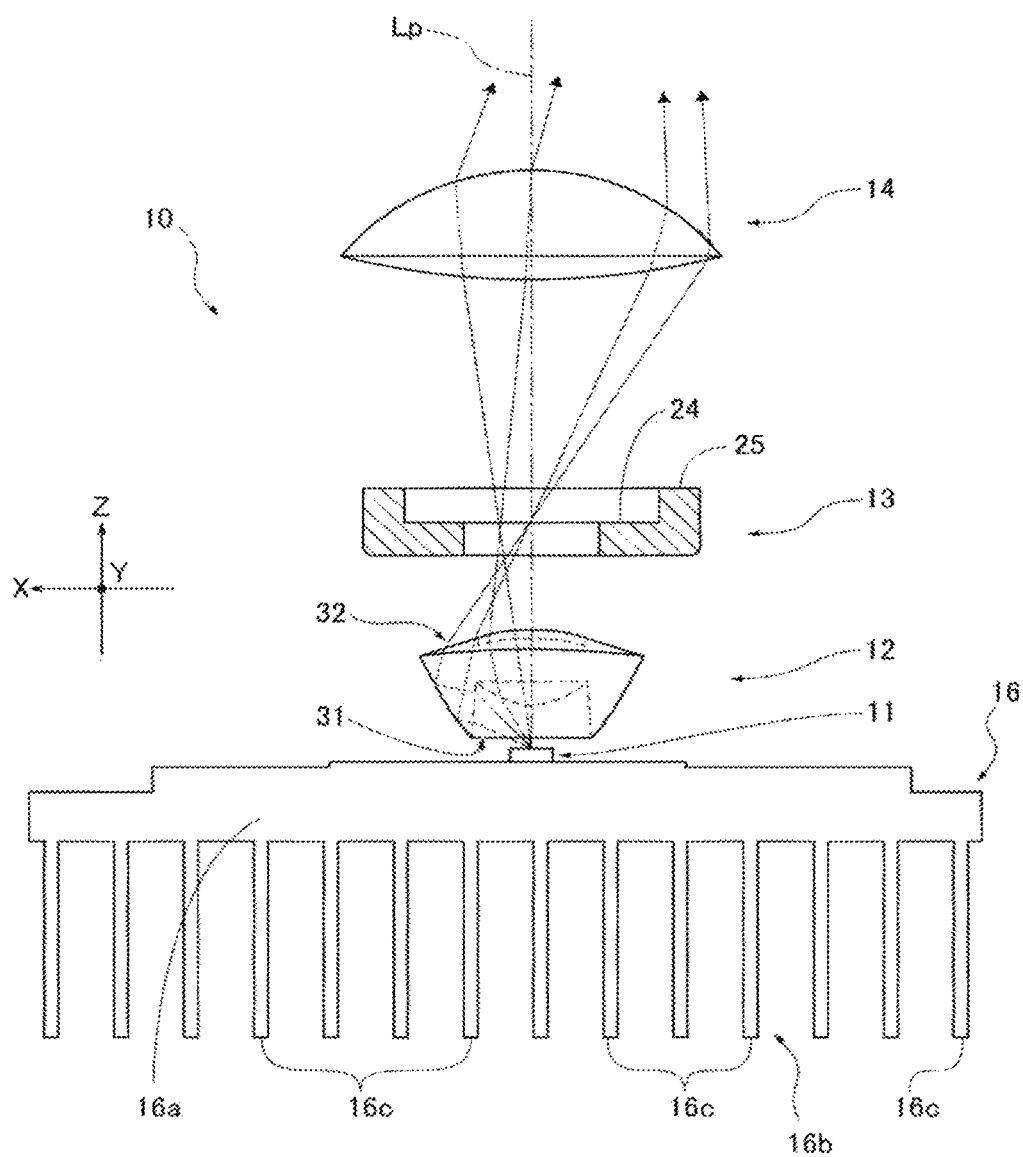
FIG. 8 is an explanatory diagram illustrating a state in which light from each of both the light sources travels on a cross-section in the vehicle lighting.

Hereinafter, Example 1 of vehicle lighting 10 as an example of vehicle lighting according to the present disclosure will be described with reference to the drawings. In order to make it easier to understand how the vehicle lighting 10 is provided, FIG. 1 illustrates the vehicle lighting 10 with respect to the vehicle 1, with emphasis on the vehicle lighting 10, which does not necessarily coincide with actual appearance. In FIG. 8, hatching illustrating a cross section in a condenser lens is omitted in order to make it easier to understand how light travels. Furthermore, in FIG. 9 to FIG. 15, in order to make it easier to understand how each area is formed on a shade (each slit section of that shade section), a shade frame section is omitted.

Example 1

The vehicle lighting 10 of Example 1 according to an embodiment of the vehicle lighting according to the present disclosure will be described with reference to FIG. 1 to FIG. 15. As illustrated in FIG. 1, each vehicle lighting 10 of Example 1 is used as lighting for a vehicle 1 such as an automobile, and is provided in a front section of the vehicle 1 to form an irradiation pattern Pi on a peripheral road surface 2 in front of the vehicle 1, apart from a headlight provided in the vehicle 1. The periphery in front of the vehicle 1 always includes a proximity area closer to the vehicle 1 than a headlight area irradiated by the headlight provided in the vehicle 1, and may partially include the headlight area. The vehicle lighting 10 may also form the irradiation pattern Pi on the peripheral road surface 2 behind and on the lateral side of the vehicle 1, and is not limited to the configuration of Example 1.

In Example 1, each vehicle lighting 10 is positioned higher than the road surface 2 at a front end of the vehicle 1 with a projected optical axis Lp inclined with respect to the road surface 2. Two of the vehicle lighting 10 basically have equal configurations, except that positions to be mounted and positions where the irradiation patterns Pi are formed are different. In the following description, the direction in which the projected optical axis Lp extends, which is the direction of light irradiation, in each vehicle lighting 10 is defined as the optical axis direction (Z in the drawing), the vertical direction when the optical axis direction is along a horizontal plane is defined as the up-down direction (Y in the drawing), and the direction orthogonal to the optical axis direction and the up-down direction (horizontal direction) is defined as the width direction (X in the drawing) (see FIG. 2 and the like).

Figure 2:
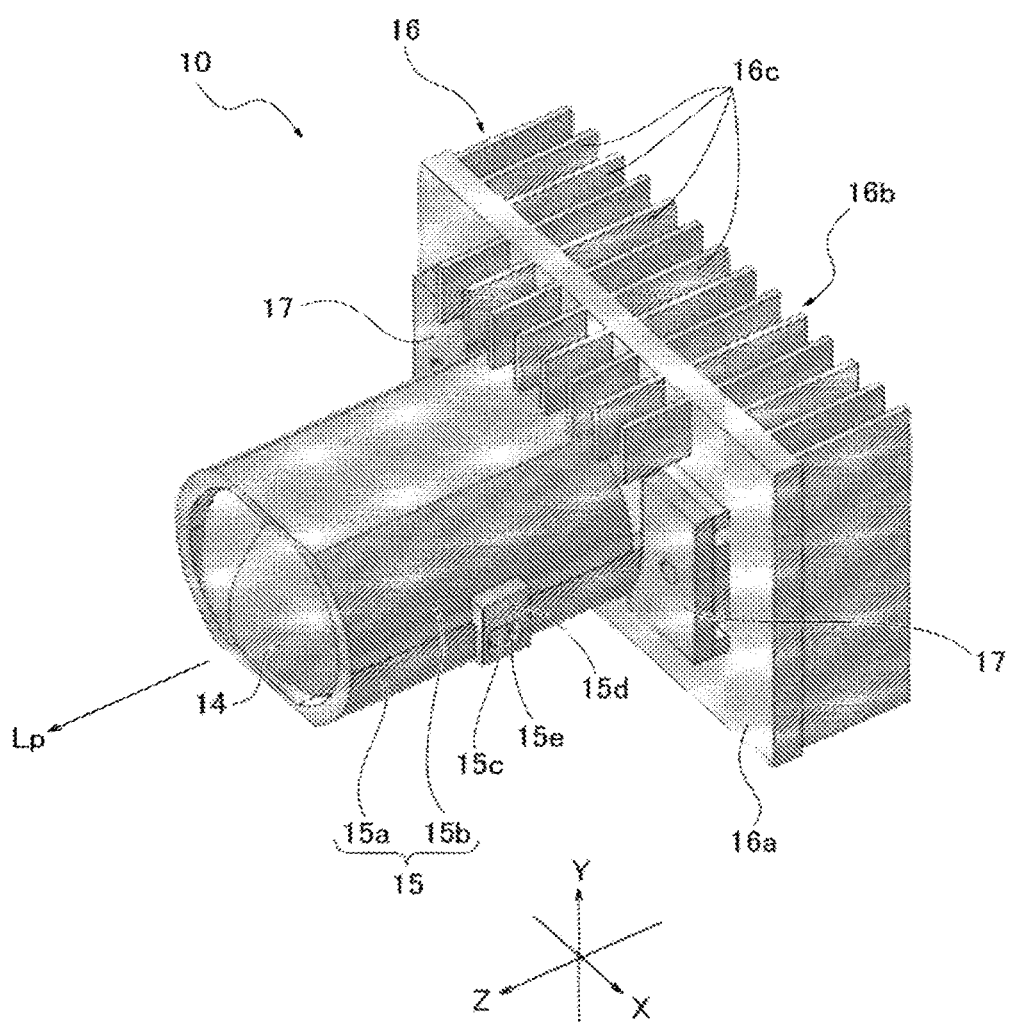
FIG. 2 is an explanatory diagram illustrating a configuration of the vehicle lighting.
Figure 3:
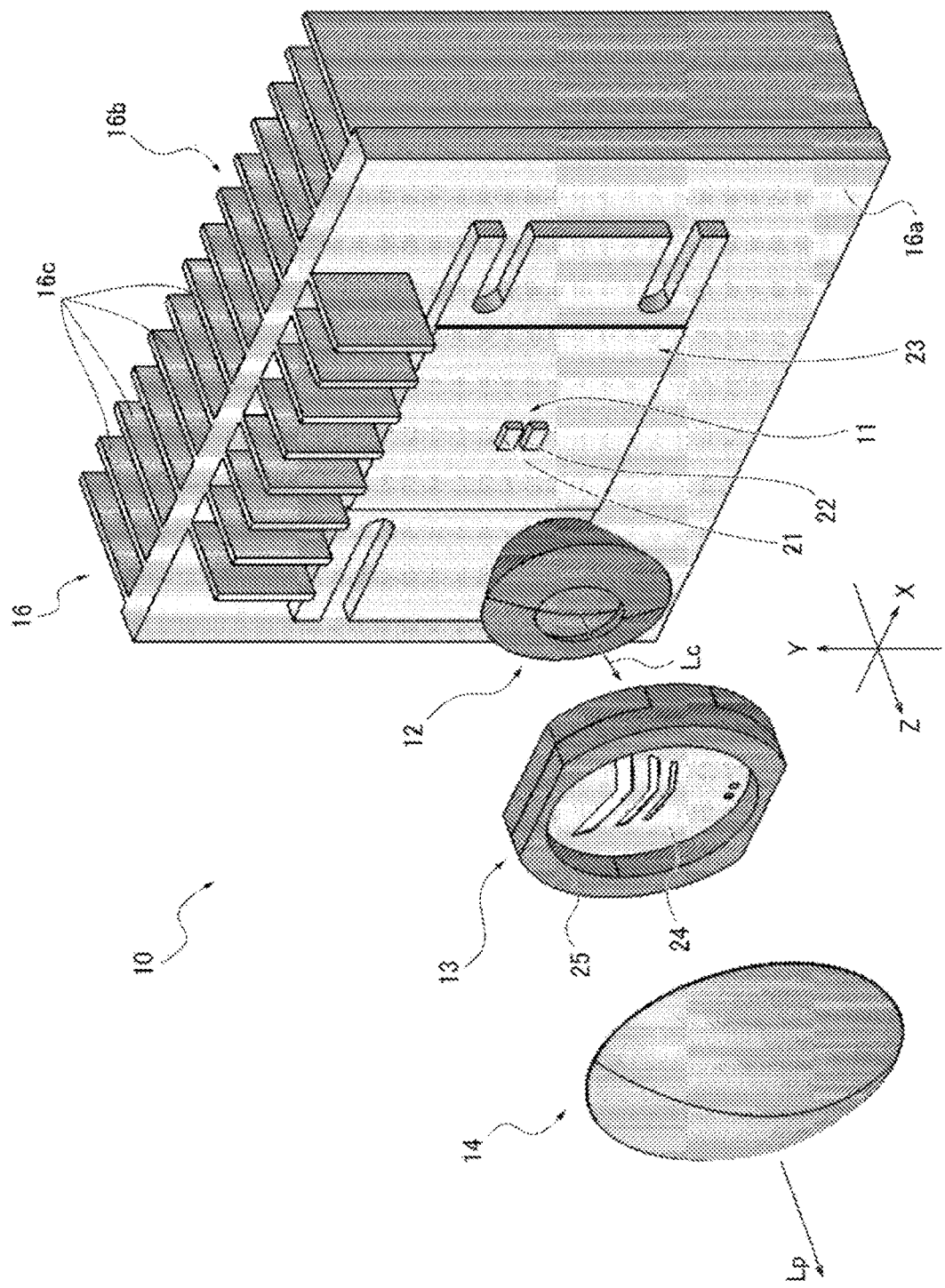
FIG. 3 is an explanatory diagram illustrating a configuration of the vehicle lighting without a housing.

As illustrated in FIG. 2 and FIG. 3, in the vehicle lighting 10, a light source section 11, a condenser lens 12, a shade 13, and a projection lens 14 are housed in a housing 15 to form a single projection optical system, which constitutes a projector-type road surface projection unit. The housing 15 is composed of a semi-cylindrical lower member 15a and upper member 15b. The lower member 15a and the upper member 15b are fitted together and attached to an installation base section 16, in a state in which each of the above components (12 to 14) is installed in the lower member 15a. In the housing 15, a condenser lens groove for fitting the condenser lens 12, a shade groove for fitting the shade 13, and a projection lens groove for fitting the projection lens 14 are provided. In the housing 15, the lower member 15a is provided with a pair of fixing protrusions 15c in the width direction, and the upper member 15b is provided with a pair of fixing pieces 15d in the width direction (both illustrated only on the front side in FIG. 2), so that each fixing protrusion 15c and a fixing hole 15e of each fixing pieces 15d can fit together. The shape and other configurations of the housing 15 may be set as appropriate and are not limited to the configuration of Example 1.

The installation base section 16 is a spot where the light source section 11 is provided, and is formed of thermally conductive aluminum die-cast or resin, and functions as a heat sink that dissipates, to the outside, heat generated by the light source section 11 as a whole. The installation base section 16 has an installation spot 16a and a heat radiation spot 16b. The installation spot 16a is a spot where the light source section 11 (its base plate 23) is installed, and is a flat plate perpendicular to the optical axis direction. In the installation spot 16a, attachment pieces 17 are provided at such positions as to interpose the light source section 11 therebetween in the width direction, and the housing 15 in which the lower member 15a and the upper member 15b are fitted together is attached through both the attachment pieces 17. The heat radiation spot 16b has a plurality of heat radiating fins 16c provided continuously to the installation spot 16a. The heat radiation spot 16b radiates heat generated by the light source section 11 installed in the installation spot 16a mainly from each heat radiating fin 16c to the outside.

The light source section 11 has a first light source 21, a second light source 22, and the base plate 23 on which the first light source 21 and the second light source 22 are mounted. The first light source 21 and the second light source 22 are composed of light emitting devices such as LEDs (Light Emitting Diodes). The first light source 21 and the second light source 22 emit amber-colored light (amber-colored light) with a Lambertian distribution centered on the emission optical axis in Example 1. The first light source 21 and the second light source 22 are not limited to the configuration of Example 1, as the color (wavelength band), the mode of a distribution, and the number of colors can be set as needed.

Figure 4:
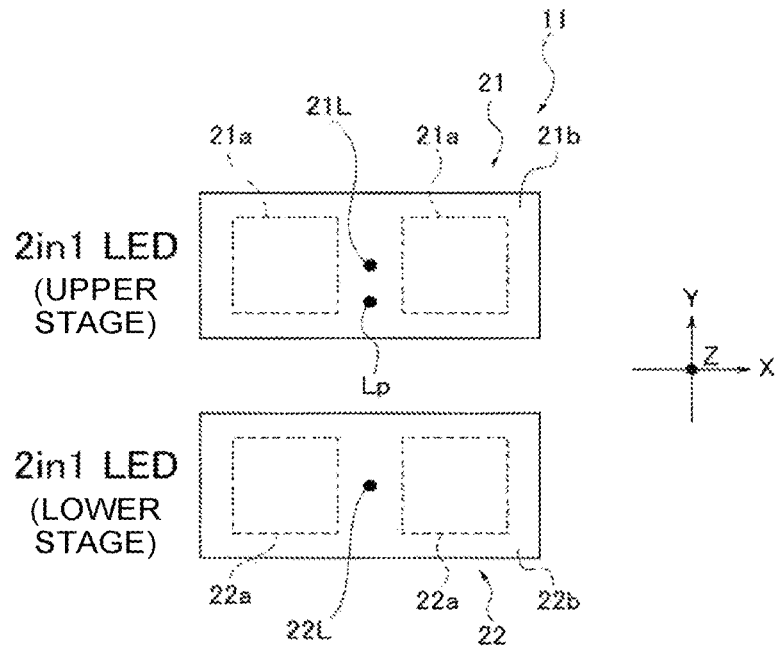
FIG. 4 is an explanatory diagram illustrating a configuration and positional relationship of a first light source and a second light source.

The first light source 21 and the second light source 22 of Example 1 basically have equal configurations except that positions to be mounted are different, as illustrated in FIG. 4. The first light source 21 and the second light source 22 have two LED chips 21a and two LED chips 22a each arranged in parallel in the width direction, and fluorescent substances 21b and 22b that cover the LED chips 21a and the LED chips 22a, respectively, and light from each of the LED chips 21a and 22a is emitted as amber colored light by passing through each of the fluorescent substances 21b and 22b. Therefore, in the first light source 21, the fluorescent substance 21b functions as a first emitting surface, and in the second light source 22, the fluorescent substance 22b functions as a second emitting surface. In the first light source 21 and the second light source 22, the fluorescent substances 21b and 22b have respective rectangular shapes that are long in the width direction, and emission optical axes 21L and 22L are set by extending from respective centers in the optical axis direction. Each of the light sources 21 and 22 (each of the fluorescent substances 21b and 22b) of Example 1 is 1.15 mm in the up-down direction and 2.3 mm in the width direction.

The first light source 21 and the second light source 22 are provided in parallel in the up-down direction at an interval on the base plate 23, and the emission optical axis 21L and the emission optical axis 22L are substantially parallel to the projected optical axis Lp. In the first light source 21, the fluorescent substance 21b is located on the projected optical axis Lp, and the emission optical axis 21L is located above the projected optical axis Lp in the up-down direction. In the first light source 21 in Example 1, an interval between the emission optical axis 21L and the projected optical axis Lp in the vertical direction is about 0.3 mm. The first light source 21 is not limited to the configuration of Example 1, and as long as the fluorescent substance 21b is located on the projected optical axis Lp, the positional relationship between the emission optical axis 21L and the projected optical axis Lp can be set appropriately.

The second light source 22 is located inside an annular incident surface section 34 of the condenser lens 12, which is described below, as seen in the optical axis direction (in terms of the positional relationship projected on a plane orthogonal to the optical axis direction), and is also located such that the projected optical axis Lp and the fluorescent substance 22b projected optical axis Lp and the fluorescent substance 22b do not intersect. In the second light source 22 in Example 1, the emission optical axis 22L is located below the projected optical axis Lp in the up-down direction. The second light source 22 in Example 1 has an interval of about 1.5 mm from the first light source 21 in the vertical direction. This interval is preferably in the range of about 1.3 mm to about 2.0 mm in size, in consideration of the size of each of the light sources 21 ad 22 and the condenser lens 1.

The base plate 23 is attached to the installation spot 16a of the installation base section 16, and is mounted with the first light source 21 and the second light source 22. The base plate 23 is provided with a lighting control circuit, from which power is supplied as needed to turn on the first light source 21 and the second light source 22. The housing 15 is connected to the installation spot 16a via both the attachment pieces 17 in a state in which the base plate 23 is attached to the installation spot 16a of the installation base section 16, so that the base plate 23 is located at a rear end of the housing 15 (at an end of the installation base section 16 side in the optical axis direction) and faces the condenser lens 12 (its incident surface 31) housed in the housing 15.

Figure 5:
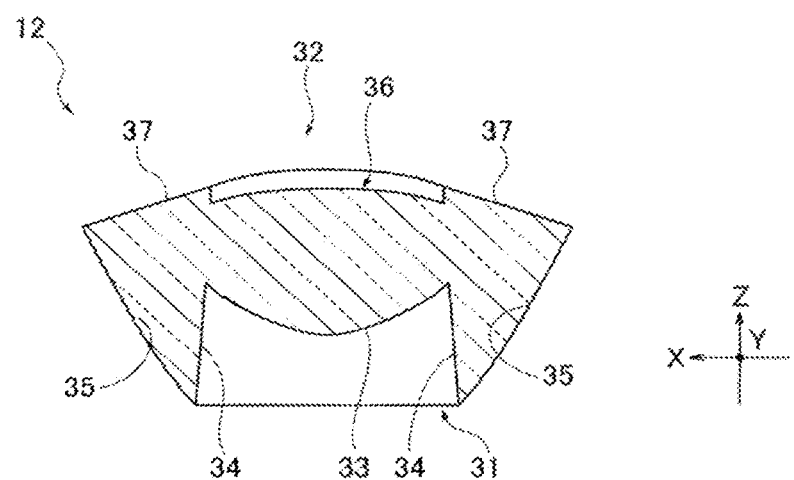
FIG. 5 is an explanatory diagram illustrating a condenser lens in cross section, corresponding to a cross section obtained with an I-I line in FIG. 6.
Figure 6:
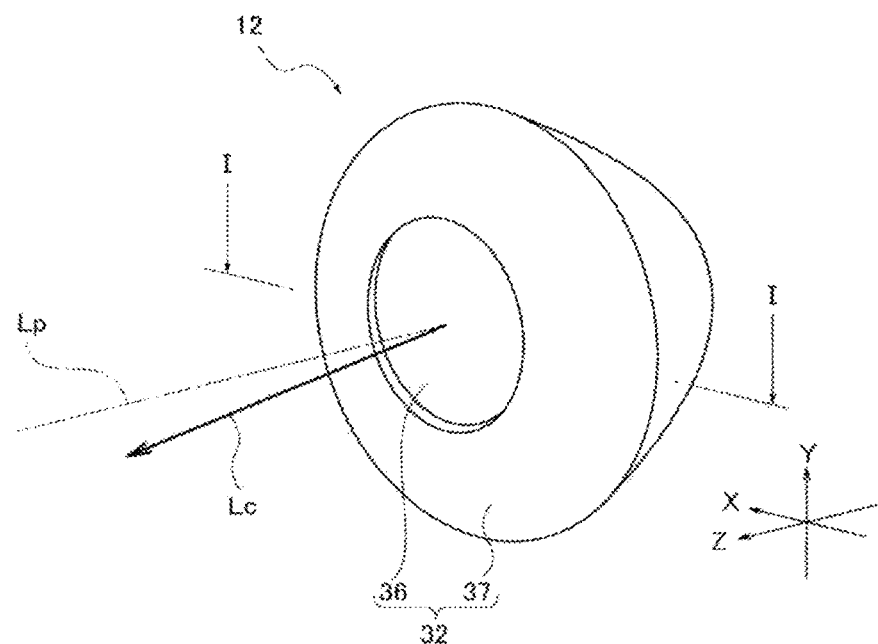
FIG. 6 is an explanatory diagram illustrating the condenser lens.

The condenser lens 12 is used to condense light emitted from the first light source 21 and the second light source 22, and condenses the light around each of slit sections 27 described below on the shade 13, that is, in an area where each of the slit sections 27 is provided while including all the slit sections 27 on the shade 13. As illustrated in FIG. 5 and FIG. 6, the condenser lens 12 is basically a convex lens, and the incident surface 31 and an emission surface 32 are configured in order to form a central light distribution area Ac and a peripheral light distribution area As (see FIG. 7) on the shade 13. These will be described below.

The shade 13 is an example of a light-shielding member that forms the irradiation pattern Pi by partially passing light from the first light source 21 and the second light source 22, condensed by the condenser lens 12. As illustrated in FIG. 1, in the irradiation pattern Pi, three irradiation patterns Di aligned at equal intervals in the direction away from the vehicle 1. When each irradiation pattern Di is individually indicated herein, the one farthest from the vehicle 1 is defined as a first irradiation pattern Di1, and the others from the first irradiation pattern Di1 are defined as a second irradiation pattern Di2 and a third irradiation pattern Di3 in order as the pattern approaches the vehicle 1. Therefore, in the irradiation pattern Pi, the first irradiation pattern Di1 becomes a far irradiation pattern, the third irradiation pattern Di3 becomes a near irradiation pattern, and the second irradiation pattern Di2 between the first irradiation pattern Di1 and the third irradiation pattern Di3 becomes an intermediate irradiation pattern. In Example 1, each irradiation pattern Di is a large open V-shaped symbol, and the first irradiation pattern Di1 is slightly larger than the other two irradiation patterns Di2 and Di3.

This irradiation pattern Pi is formed on the road surface 2, which is a projection plane, with the first irradiation pattern Di1, the second irradiation pattern Di2, and the third irradiation pattern Di3 lined up in the direction of the arrow Da while being long in the direction orthogonal to the direction of the arrow Da, which is described later. The direction in which the arrow as the irradiation pattern Pi points, that is, the direction in which the V-shaped vertexes of the irradiation patterns Di are aligned, is defined as the direction of the arrow Da, and the pointing side (first irradiation pattern Di1 side) is the front side of the direction of the arrow Da. The irradiation pattern Pi can be made to look like an arrow pointing from the vehicle 1 to the direction of the arrow Da by arranging the three irradiation patterns Di. In the first irradiation pattern Di1, two side ends Die located in the direction orthogonal to the direction of the arrow Da are straight lines inclined inward (toward the side approaching the vehicle 1) toward the rear of the direction of the arrow Da, that is, are inclined inward with respect to the direction of the arrow Da. In the second irradiation pattern Di2 and the third irradiation pattern Di3, both the side ends Die are parallel to the direction of the arrow Da. The irradiation pattern Pi composed of these three irradiation patterns Di is formed by the shade 13.

Figure 7:
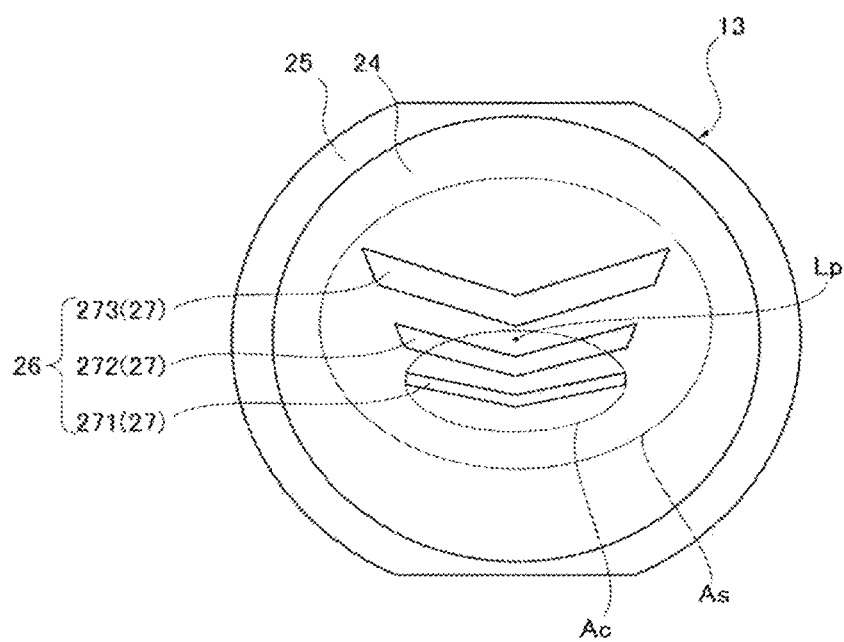
FIG. 7 is an explanatory diagram illustrating a shade.

In the shade 13, a shade section 24 is provided in a shade frame section 25, as illustrated in FIG. 7. The shade frame section 25 is a substantially circular frame that surrounds the shade section 24 and can be fitted into the shade groove of the housing 15, so that the shade frame section 25 is attached to the housing 15. In the shade frame section 25 in Example 1, an upper end and a lower end in the up-down direction are partially cut out in the width direction. In the shade 13, the shade frame section 25 is attached to the housing 15, so that the central position of the shade section 24 is located on the projected optical axis Lp.

The shade section 24 is basically formed of a plate-like member that blocks transmission of light, and has an irradiation slit 26 through which the member is partially cutout and penetrated. The irradiation slit 26 shapes the irradiation pattern Pi into a predetermined shape by partially passing light from the first and second light sources 21 and 22 condensed by the condenser lens 12. The irradiation slit 26 corresponds to the irradiation pattern Pi, and is composed of the three slit section 27 in Example 1.

These three slit sections 27 correspond to the three irradiation patterns Di on a one-to-one basis. Since the projection lens 14 inverts the shade 13 (irradiation slit 26) and projects the inverted shade onto the road surface 2, each of the slit sections 27 has such positional relationship as to be subject to rotation centered on the projected optical axis Lp with respect to positional relationship of each irradiation patterns Di of the irradiation pattern Pi (see FIG. 1, FIG. 3 and FIG. 7). Therefore, in each slit section 27, a lowermost first slit section 271 in the up-down direction is a far slit section corresponding to the first irradiation pattern Di1 (far irradiation pattern) of the irradiation pattern Pi. In each slit section 27, a second slit section 272 on the first slit section 271 is an intermediate slit section corresponding to the second irradiation pattern Di2 (intermediate irradiation pattern). In each slit section 27, an uppermost third slit section 273 is a near slit section corresponding to the third irradiation pattern Di3 (near irradiation pattern). Each slit section 27 is positioned on the shade section 24 such that each irradiation pattern Di has targeted positional relationship on the road surface 2. In the shade 13 of Example 1, the third slit section 273 is provided above the projected optical axis Lp in the up-down direction, the second slit section 272 is provided across a horizontal line including the projected optical axis Lp below the third slit section 273, and the first slit section 271 is provided below the second slit section 272. Light transmitted through this shade 13 (each slit section 27 of the irradiation slit 26) is projected onto the road surface 2 by the projection lens 14.

Each of the slit sections 27 is shaped to imitate a V-shaped symbol that largely opens like each corresponding irradiation pattern Di, and the top, the bottom, the left and the right are inversed with respect to the irradiation patterns Di. The size and the interval of the three slit sections 27 are each set in accordance with a distance to the road surface 2 such that the irradiation patterns Di on the road surface 2 have the aforementioned size illustrated in FIG. 1 at substantially equal intervals. In detail, the vehicle lighting 10 is provided such that the projected optical axis Lp is inclined with respect to the road surface 2, so that the distance from the shade 13 and the projection lens 14 to the road surface 2 varies, and therefore when each slit section 27 is projected onto the road surface 2 by the projection lens 14, each slit section 27 (each irradiation pattern Di, which is light transmitted therethrough) has the size and the interval according to that distance.

Therefore, the size and the interval of each slit section 27 are set in accordance with the distance to the road surface 2 such that the irradiation patterns Di each have the aforementioned size and are evenly spaced on the road surface 2. Specifically, in Example 1, the first slit section 271 is shaped to imitate a thin V-shaped symbol, the second slit section 272 is shaped to imitate a V-shaped symbol thicker than the first slit section 271, and the third slit section 273 is shaped to imitate a V-shaped symbol thicker than the second slit section 272, and the slit sections are elongated in the width direction than the corresponding irradiation patterns Di.

Thus, the three slit sections 27 have different sizes and different intervals from each other, unlike the irradiation patterns Di. In the slit sections 27, the first slit section 271 has the smallest reduction ratio to the corresponding irradiation pattern Di, and when light that passes through the first slit section is projected onto the road surface 2, the light is magnified at the greatest magnification rate to form the first irradiation pattern Di1. In the slit sections 27, the third slit section 273 has the greatest reduction ratio to the corresponding irradiation pattern Di, and when light that passes through the third slit section is projected onto the road surface 2, the light is magnified at the smallest magnification rate to form the third irradiation pattern Di3.

The projection lens 14 is a circular convex lens viewed in the optical axis direction, as illustrated in FIG. 2. In Example 1, the projection lens 14 has free curved surface with an incident surface and an emission surface which are convex. The projection lens 14 projects the irradiation slit 26 (each slit section 27 thereof) of the shade 13 to form an irradiation pattern Pi on the road surface 2 that is inclined with respect to the projected optical axis Lp, as illustrated in FIG. 1. The incident surface and the emission surface may be convex or concave, as long as the projection lens 14 is a convex lens, and are not limited to the configuration of Example 1. The projection lens 14 is mounted on the housing 15 in a state in which the projection lens optical axis coincides with the projected optical axis Lp when the projection lens 14 is fitted into the projection lens groove. In other words, the projection lens optical axis of the projection lens 14 is the projected optical axis Lp.

Now, a configuration of the condenser lens 12 will be described with reference to FIG. 5 and FIG. 6. The condenser lens 12 is substantially circular in shape in front view in the optical axis direction. The condenser lens 12 in Example 1 has substantially the same diameter as the shade section 24 of the shade 13, and as a whole, the condenser lens 12 condenses spread light emitted from both the light sources (21, 22) in a state close to parallel to the projected optical axis Lp, and causes the condensed light to travel toward the shade section 24. When the condenser lens 12 is fitted into the condenser lens groove of the housing 15, a condenser lens optical axis Lc is inclined downward (toward the bottom in the up-down direction as moving toward the front in the optical axis direction) relative to the projected optical axis Lp (see FIG. 3 and FIG. 6). The condenser lens 12 of Example 1 is designed such that the condenser lens optical axis Lc extends toward the vicinity of the vertex of the first irradiation pattern Di1 on the shade 13.

This condenser lens 12 has the incident surface 31 facing the light source section 11 and an emission surface 32 directed to the opposite side. The condenser lens 12 of Example 1 has the optical settings of the incident surface 31 and the emission surface 32 in order to form the central light distribution area Ac and the peripheral light distribution area As on the shade 13 by the light emitted from the light source sections 11, namely, the first light source 21 and the second light source 22, as illustrated in FIG. 7.

The central light distribution area Ac is an area of high light intensity formed on the shade 13, and the light intensity in the vicinity of the vertex of the first irradiation pattern Di1 is the highest value. Therefore, in Example 1, the vicinity of the vertex of the first slit section 271 that forms the first irradiation pattern Di1 is a maximum light intensity spot on the shade 13. The central light distribution area Ac includes a substantially entire area of the first irradiation pattern Di1 and an area from the vertex to intermediate positions in the width direction in the second irradiation pattern Di2. The peripheral light distribution area As is an area with lower light intensity than the central light distribution area Ac, and surrounds the central light distribution area Ac. The peripheral light distribution area As in Example 1 has a large difference in light intensity from the central light distribution area Ac, and the change in light intensity is continuous at a boundary with the central light distribution area Ac. In other words, the peripheral light distribution area As in Example 1 has a larger degree of light intensity change at the boundary with the central light distribution area Ac so as to add inflection (modulation) with the central light distribution area Ac in terms of brightness, and a wide area around the central light distribution area Ac is brightened.

As illustrated in FIG. 5, FIG. 8, and other figures, the incident surface 31 has a central section recessed inward (side opposite to the light source section 11) of the condenser lens 12, a curved incident surface section 33 convexed outward at the center of the incident surface 31, and the annular incident surface section 34 surrounding the curved incident surface section 33. Around the incident surface 31, a conical reflective surface 35 that surrounds the annular incident surface section 34 is provided.

The curved incident surface section 33 faces the light source section 11 in the optical axis direction (see FIG. 8), and the light source section 11 is located near a focal point on the rear side (rear focal point). The curved incident surface section 33 causes light emitted from the light source section 11 to enter the condenser lens 12 as collimated light that travels substantially parallel to the condenser lens optical axis Lc. This collimated light (parallel light) refers to light that is collimated by passing through the curved incident surface section 33.

The annular incident surface section 34 is provided so as to protrude toward the light source section 11 and causes light from the light source section 11, which does not travel to the curved incident surface section 33, to enter the condenser lens 12. The reflective surface 35 is formed at a position where the light which enters the condenser lens 12 from the annular incident surface section 34 travels. When the reflective surface 35 reflects the light incident from the annular incident surface section 34, the reflected light becomes collimated light which travels substantially parallel to the condenser lens optical axis Lc. The reflective surface 35 may reflect light using total reflection or by bonding aluminum or silver by vapor deposition or painting. From these, the incident surface 31 causes the light emitted from the light source section 11 to travel into the condenser lens 12 as collimated light which travels substantially parallel to the condenser lens optical axis Lc, and then guides the light to the emission surface 32.

Therefore, in the condenser lens 12, at the incident surface 31, light that passes through the curved incident surface section 33 becomes direct light directly toward the emission surface 32, while light which has passed through the annular incident surface section 34 and is reflected by the reflective surface 35 becomes reflected light toward the emission surface 32 after being reflected internally.

The emission surface 32 emits, to the front side in the front-back direction, light incident from the incident surface 31 and made to be collimated light. The emission surface 32 is substantially circular in front view and has an inner emission surface section 36 and an outer emission surface section 37 with different optical setting. The inner emission surface section 36 is provided near the center of the emission surface 32 in an area where the light travels through the curved incident surface section 33. The inner emission surface section 36 in Example 1 is substantially circular in shape viewed from the front. The inner emission surface section 36 is recessed inward (toward the incident surface 31 (rear side in the front-rear direction)) in the condenser lens 12 with respect to the outer emission surface section 37. The inner emission surface section 36 refracts the light that passes through the curved incident surface section 33, so that the inner emission surface section 36 causes the refracted light to travel toward the front side in the front-rear direction while diffusing the refracted light significantly in the width direction (horizontal direction). The inner emission surface section 36 radiates the light from the light source section 11 through the curved incident surface section 33 to form a plurality of light distribution images of the light source section 11, that is, the first light source 21 and the second light source 22, which are overlapped as appropriate on the shade 13 (each slit section 27 of the shade section 24 thereof) at a position according to an optical characteristic. This optical characteristic can be set by adjusting the curvature (surface shape) of the inner emission surface section 36 along with the curved incident surface section 33 at each location, and in Example 1, the curvature is set by gradually changing the curvature.

Figure 9:
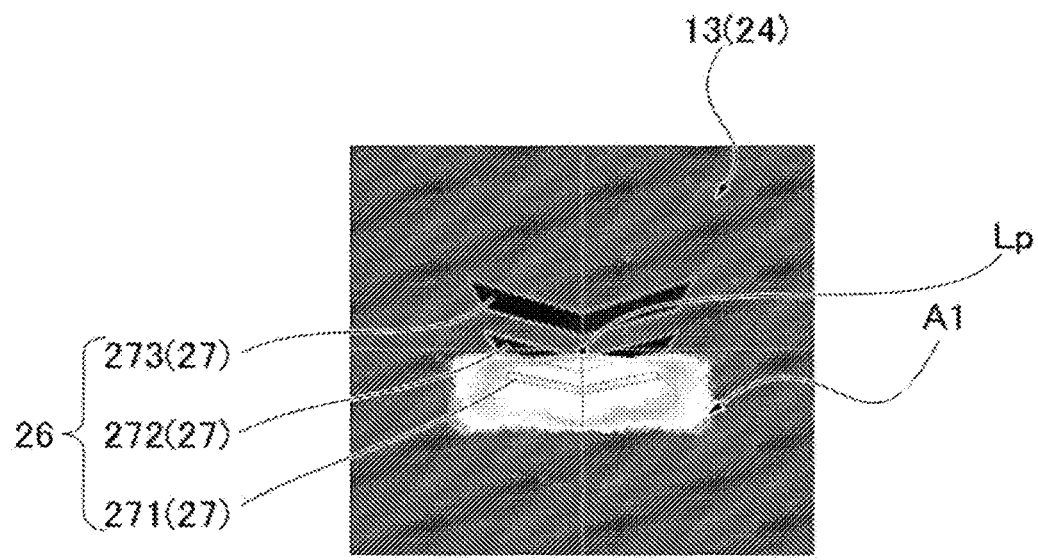
FIG. 9 is an explanatory diagram illustrating a light distribution in a first area where light from a first light source, which is incident on the condenser lens from a curved incident surface section to be emitted from an inner emission surface section, forms on the shade.

This inner emission surface section 36 appropriately refracts the light that has been emitted from the first light source 21 and has passed through the curved incident surface section 33, so that the light is radiated on the shade 13, and a first area A1 illustrated in FIG. 9 is formed. This first area A1 includes the entire area of the first slit section 271 as well as the vicinity of the vertex of the second slit section 272. In the first area A1, the entire area of the first slit section 271 and the vicinity of the vertex of the second slit section 272 have substantially uniform light intensity.

Figure 10:
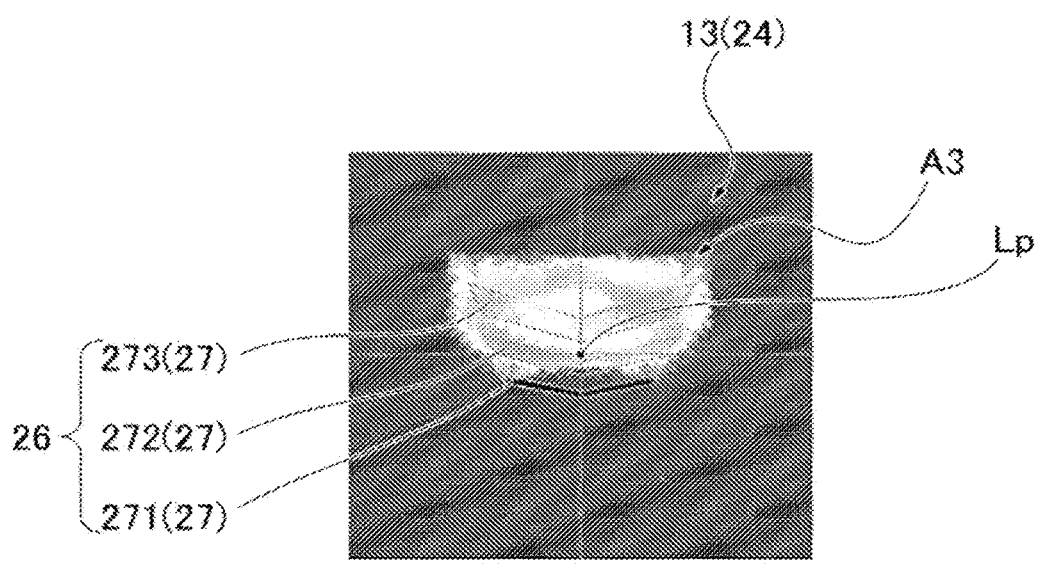
FIG. 10 is an explanatory diagram illustrating a light distribution in a third area where light from a second light source, which is incident on the condenser lens from the curved incident surface section to be emitted from the inner emission surface section, forms on the shade.

The inner emission surface section 36 appropriately refracts the light that has been emitted from the second light source 22 and has passed through the curved incident surface section 33, so that the light is radiated on the shade 13, and a third area A3 illustrated in FIG. 10 is formed. This third area A3 includes the entire area of the third slit section 273 as well as the entire area except the vicinity of the vertex of the second slit section 272. In the third area A3, the light intensity in the vicinity of the vertex of the third slit section 273 is made the highest, and irradiates both side ends of the second slit section 272 and the third slit section 273 in the width direction.

The outer emission surface section 37 is provided in an area surrounding the inner emission surface section 36 as illustrated in FIG. 5, FIG. 6, and FIG. 8, and is located in the area where the light that passes from both the light sources (21, 22) via the annular incident surface section 34 and is reflected by the reflective surface 35 travels. The outer emission surface section 37 is located (protrudes) on the outer side (front side in the front-rear direction) in the condenser lens 12 with respect to the inner emission surface section 36. The outer emission surface section 37 refracts the light that passes from the light source section 11 through the annular incident surface section 34 and is reflected by the reflective surface 35, so that the outer emission surface section 37 causes the refracted light to travel toward the front side in the front-rear direction while condensing the refracted light on the condenser lens optical axis Lc. This outer emission surface section 37 radiates the light reflected by the reflective surface 35 to form a plurality of light distribution images of the light source section 11, that is, the first light source 21 and the second light source 22, which are overlapped as appropriate, at a position according to the optical characteristic on the shade 13. This optical characteristic can be set by adjusting the curvature (surface shape) of the outer emission surface section 37 along with the reflective surface 35 at each location, and in Example 1, the curvature is set by gradually changing the curvature.

Figure 11:
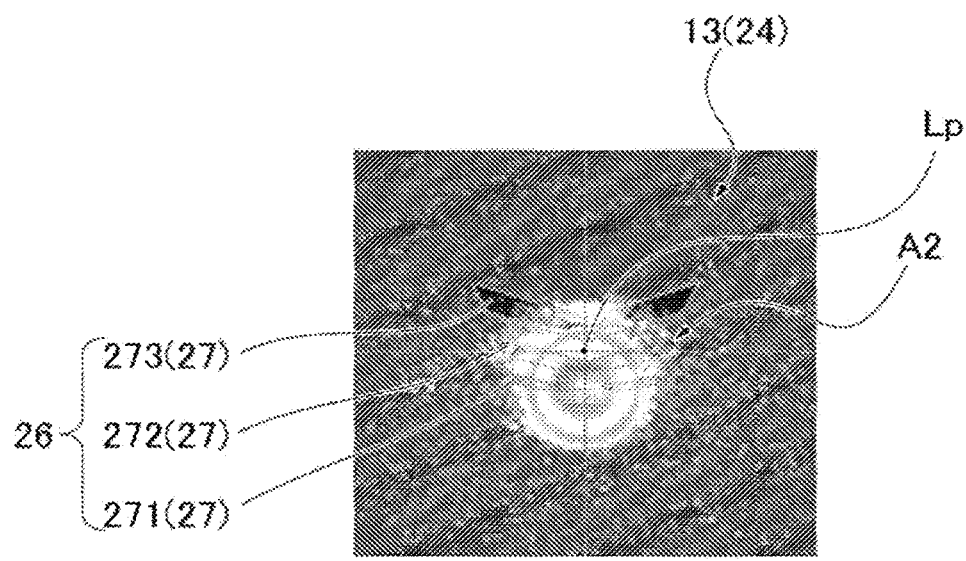
FIG. 11 is an explanatory diagram illustrating a light distribution in a second area where light from the first light source, which is incident on the condenser lens from an annular incident surface section to be emitted from an outer emission surface section after reflection by a reflective surface, forms on the shade.

This outer emission surface section 37 appropriately refracts the light that is emitted from the first light source 21 through the annular incident surface section 34 and is reflected by the reflective surface 35, so that the light is radiated on the shade 13, and a second area A2 illustrated in FIG. 11 is formed. This second area A2 includes the substantially entire area of the first slit section 271, the vicinity of both the side ends in the width direction from the vertex of the second slit section 272, and the vicinity of the vertex of the third slit section 273. In the second area A2, the vicinity of the vertex of the first slit section 271 has the highest light intensity, and an area from the vertex of the first slit section 271 to the intermediate positions in the width direction and the vicinity of the vertex of the second slit section 272 have the next highest light intensity. In the second area A2, an area except the vicinity of both the side ends in the width direction of the first slit section 271, and an area from the vertex of the second slit section 272 to the intermediate positions in the width direction have the next highest light intensity. Thus, in the second area A2, the vicinity of the vertex of the first slit section 271 has the highest light intensity, and an area around the vicinity of the vertex of the first slit section narrower than the first area A1 and the third area A3 is brighter than the first area A1 and the third area A3.

Figure 12:
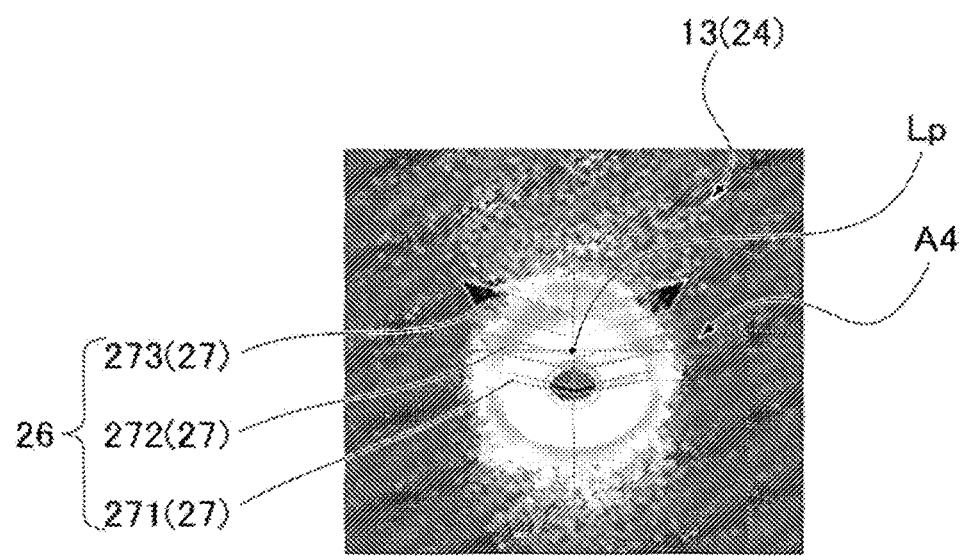
FIG. 12 is an explanatory diagram illustrating a light distribution in a fourth area where light from the second light source, which is incident on the condenser lens from the annular incident surface section to be emitted from the outer emission surface section after reflection by a reflective surface, forms on the shade.

The outer emission surface section 37 appropriately refracts the light that is emitted from the second light source 22, passes through the annular incident surface section 34, and is reflected by the reflective surface 35, so that the light is radiated on the shade 13, and a fourth area A4 illustrated in FIG. 12 is formed. This fourth area A4 includes the area except the vicinity of the vertex of the first slit section 271, the entire area of the second slit section 272, and the area except the vicinity of both the side ends the third slit section 273. The fourth area A4 is centered on the vicinity of the vertex of the first slit section 271 like the second area A2, and an area wider than the second area A2 is darker than the second area A2. In the fourth area A4, the irradiated area has substantially uniform light intensity.

Thus, the condenser lens 12 forms the first area A1 mainly below the projected optical axis Lp by light from the first light source 21 through the inner emission surface section 36 and the third area A3 mainly above the projected optical axis Lp by light from the second light source 22 through the inner emission surface section 36. This may be because light emitted from both the light sources (21, 22) travels directly in the inner emission surface section 36, and therefore the position of the light sources (21, 22) relative to the projected optical axis Lp is reflected in the position where the area is formed (position where the light is projected). In contrast, the condenser lens 12 forms the second area A2 centered on the vertex of the first slit section 271 by light from the first light source 21 through the outer emission surface section 37, and forms the fourth area A4 centered on the vertex of the first slit section 271 by light from the second light source 22 through the outer emission surface section 37. This may be because the light emitted from both the light sources (21, 22) is reflected by the reflective surface 35 and then travels in the outer emission surface section 37, and therefore the position of the light sources (21, 22) relative to the projected optical axis Lp is not well reflected in the position where the area is formed (position where the light is projected). In other words, the condenser lens 12 can form the central light distribution area Ac and the peripheral light distribution area As on the shade 13 with the light through the inner emission surface section 36 and the light through the outer emission surface section 37 by utilizing change of the presence or absence of the reflection of the positions of both the light sources (21, 22) as described above.

Figure 13:
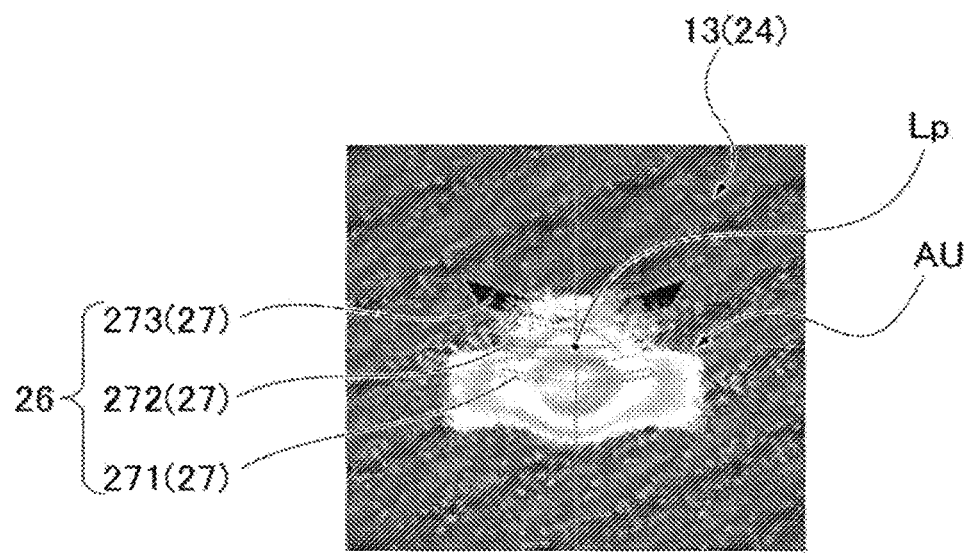
FIG. 13 is an explanatory diagram illustrating a light distribution when the first area and the second area by the first light source are overlapped on the shade.

From these, the condenser lens 12 emits, from the inner emission surface section 36 and the outer emission surface section 37, light from the first light source 21, which is positioned on the upper side of both the light sources 21 and 22, as described above, so that an upper light source formation area AU illustrated in FIG. 13 is formed. This upper light source formation area AU is an area where the above first area A1 and second area A2 are overlapped, and the entire area of the first slit section 271 and the area from the vertex of the second slit section 272 to the intermediate positions in the width direction are brightened while the vicinity of the vertex of the first slit section 271 is made the brightest.

Figure 14:
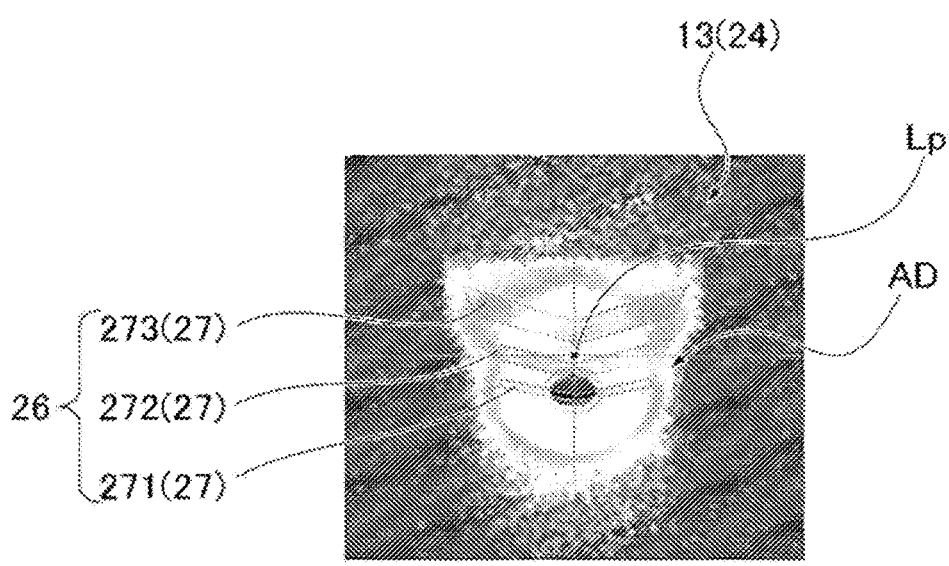
FIG. 14 is an explanatory diagram illustrating a light distribution when the third area and the fourth area by the second light source are overlapped on the shade.
Figure 15:
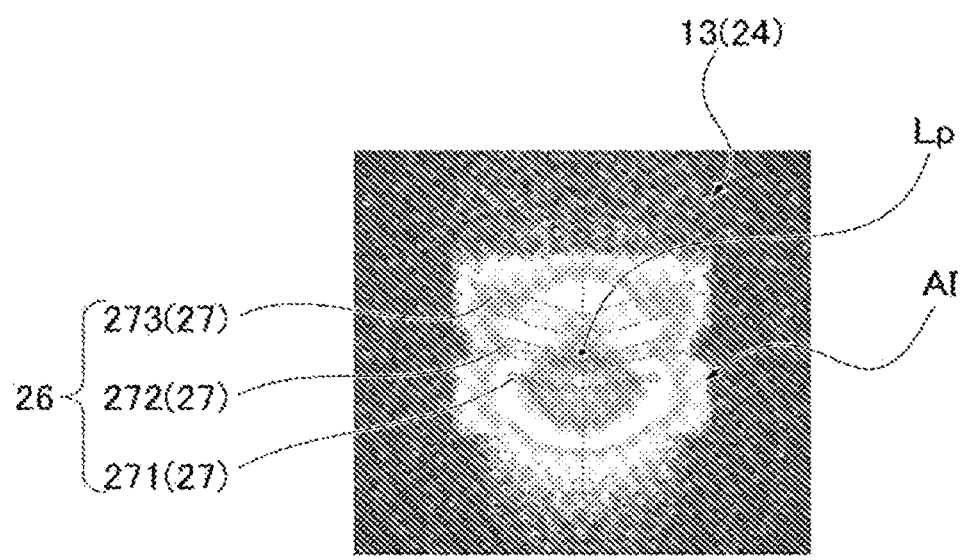
FIG. 15 is an explanatory diagram illustrating a light distribution on the shade, by the first light source and the second light source.

The condenser lens 12 emits light from the second light source 22, which is positioned on the lower side of both the light sources 21 and 22, from the inner emission surface section 36 and the outer emission surface section 37 as described above, so that a lower light source formation area AD illustrated in FIG. 14 is formed. This lower light source formation area AD is an area where the above third area A3 and fourth area A4 are overlapped, and the whole of the three slit sections 271, 272 and 273 except the vicinity of the vertex of the first slit section 271 are brightened.

From these, the condenser lens 12 forms an irradiated area A1 on the shade 13 with the light emitted from the light source sections 11, that is, the first light source 21 and the second light source 22. The irradiated area A1 is an area where the above upper light source formation area AU and lower light source formation area AD are overlapped, and the whole of the three slit sections 271, 272 and 273 are brightened while the vicinity of the vertex of the first slit section 271 is the brightest. In the irradiated area A1, the bright area centered on the vicinity of the vertex of the first slit section 271 corresponds to the central light distribution area Ac, and the peripheral area corresponds to the peripheral light distribution area As. Thus, the condenser lens 12 can form the central light distribution area Ac and the peripheral light distribution area As on the shade 13.

The vehicle lighting 10 is assembled as follows, with reference to FIG. 2 and FIG. 3. First, the first light source 21 and the second light source 22 are mounted on the base plate 23 to assemble the light source section 11, and the light source section 11 is fixed to the installation spot 16a of the installation base section 16. Thereafter, in the lower member 15a of the housing 15, the condenser lens 12 is fitted into the condenser lens groove, the shade 13 is fitted into the shade groove, and the projection lens 14 is fitted into the projection lens groove. The upper member 15b is fitted to the lower member 15a to form the housing 15, and the housing 15 is then attached to the installation base section 16 via both the attachment pieces 17 provided at the installation spot 16a. Then, the light source section 11 is provided so as to face the condenser lens 12 while the condenser lens 12, the shade 13, and the projection lens 14 are housed in the housing 15. Consequently, the condenser lens 12, the shade 13, and the projection lens 14 are aligned on the projected optical axis Lp in this order from the light source section 11 in predetermined positional relationship, so that the vehicle lighting 10 is assembled. This vehicle lighting 10 is provided in a light chamber in a state in which the projected optical axis Lp is directed diagonally forward outside the vehicle 1 while inclined to the road surface 2 around the vehicle 1 (see FIG. 1).

Now, action of the vehicle lighting 10 will be described. The vehicle lighting 10 can supply power from the lighting control circuit to both the light sources (21, 22) from the base plate 23, so that the light sources are turned on and off as appropriate. The light from both the light sources (21, 22) is condensed by the condenser lens 12 to radiate the shade 13, and passes through the irradiation slit 26 (each slit section 27), and thereafter the light is projected by the projection lens 14, so that the irradiation pattern Pi is formed on the road surface 2. In the irradiation pattern Pi, the light transmitted through the irradiation slit 26 (each slit section 27 thereof) of the shade 13, which has the above light distribution, is projected by the projection lens 14, so that while the first irradiation pattern Di1, especially the vicinity of a tip thereof is the brightest, the three irradiation patterns Di are arranged in a substantially straight line. In the vehicle lighting 10 of Example 1, the first light source 21 and the second light source 22 are monochromatic light sources, and therefore the influence of chromatic aberration in the projection lens 14 can be greatly suppressed and the irradiation pattern Pi, that is, each irradiation pattern Di can be made clear.

The vehicle lighting 10 is linked to a turn lamp, and when either the left or right turn lamp is turned on, the first light source 21 and the second light source 22 provided on the side where the turn lamp is turned on are turned on to form the irradiation pattern Pi on the road surface 2. Therefore, the vehicle lighting 10 can make the irradiation pattern Pi formed on the road surface 2 visible even when a person in another alley cannot visually recognize the vehicle 1 in a scene where the vehicle 1 is about to travel from an alley with poor visibility to another alley. In addition, when a hazard lamps are turned on, the vehicle 1 can more reliably recognize that the hazard lamps are on compared to a case where only the left and right turn lamps are flashing, because the left vehicle lighting 10 and the right vehicle lighting 10 simultaneously form the irradiation patterns Pi on the road surface 2.

Furthermore, in each irradiation pattern Di of the irradiation pattern Pi to be formed, the vehicle lighting 10 has both the side ends Die of the first irradiation pattern Di1 inclined inward to the direction of the arrow Da, and both the side ends Die of each of the remaining two irradiation patterns Di parallel to the direction of the arrow Da. Therefore, the vehicle lighting 10 can give the impression that the first irradiation pattern Di1 corresponds to an arrowhead in an arrow symbol and the remaining two irradiation patterns Di correspond to a shaft in the arrow symbol, so that the vehicle lighting 10 can more effectively give the impression of pointing in the direction of the arrow Da. Consequently, the vehicle lighting 10 can instantly make a person around the vehicle 1 know that the irradiation pattern Pi is pointing in the direction of the arrow Da. In addition, the vehicle lighting 10 can make a person in front of the vehicle 1 on either side of the vehicle 1 appear as if both the side ends Die of the first irradiation pattern Di1 are pointing toward him or her, and it is possible to give the impression that the vehicle intends to turn in the direction in which the person is present.

The vehicle lighting 10 guides the light from the first light source 21 and the second light source 22 onto the shade 13, and therefore the brightness of the irradiation pattern Pi formed through the irradiation slit 26 can be sufficient. The first light source 21 and the second light source 22 each generate heat, and therefore the first light source 21 and the second light source 22 are disposed at a distance from each other, so that it is possible to radiate heat.

Herein, the conventional vehicle lighting described in the prior art document has a plurality of light guides individually corresponding to a plurality of light sources to efficiently utilize light from each light source. In this conventional vehicle lighting, each light guide member diffuses light inside to emit light with a substantially uniform brightness distribution, and the light through each light guide member radiates a shade (light-shielding member) to make the light distribution on the shade substantially uniform. In conventional vehicle lighting, light from the light source corresponding to each light guide is guided on the shade, and therefore the light from the corresponding light source is guided onto the shade separately for each light source. Therefore, it is difficult for the conventional vehicle lighting to obtain the desired light distribution on the shade, like partial formation of high light intensity areas while keeping the light intensity change continuous in low light intensity areas.

In contrast, the vehicle lighting 10 is provided with the single condenser lens 12 for the two light sources (21, 22), which guides light emitted from each light source inward from the incident surface 31 and emits from the emission surface 32. In the vehicle lighting 10, the light emitted from each of both the light sources in the direction substantially along the emission optical axis (21L, 22L) is incident from the curved incident surface section 33 of the incident surface 31 in the condenser lens 12, while light emitted from each of both the light sources in a spreading direction (a larger angle to the emission optical axis) is incident from the annular incident surface section 34 of the incident surface 31 and reflected by the reflective surface 35. The vehicle lighting 10 emits light through the curved incident surface section 33 mainly from the inner emission surface section 36 section of the emission surface 32, and light that passes through the annular incident surface section 34 and is reflected by the reflective surface 35 is mainly emitted from the outer emission surface section 37 of the emission surface 32. Therefore, the vehicle lighting 10 can efficiently utilize the light emitted from each light source even when the single condenser lens 12 is used for the two light sources (21, 22).

The vehicle lighting 10 has a desired light distribution on the shade 13 by the condenser lens 12. In detail, the vehicle lighting 10 forms the first area A1 on the shade 13 with light from the first light source 21 through the curved incident surface section 33 of the incident surface 31 and the inner emission surface section 36 of the emission surface 32, and forms the third area A3 on the shade 13 with light from the second light source 22 through the curved incident surface section 33 and the inner emission surface section 36. The vehicle lighting 10 also forms the second area A2 on the shade 13 with light that is emitted from the first light source 21, passes through the annular incident surface section 34 of the incident surface 31, is reflected by the reflective surface 35, and passes through the outer emission surface section 37 of the emission surface 32, and forms the fourth area A4 on the shade 13 with light that is emitted from the second light source 22 through the annular incident surface section 34, is reflected by the reflective surface 35, and passes through the outer emission surface section 37. Then, the vehicle lighting 10 forms the irradiated area A1 by overlapping the above four areas (A1 to A4) on the shade 13. In the irradiated area A1, the vicinity of the vertex of the first slit section 271 is the brightest and corresponds to the central light distribution area Ac, and in the periphery of the vicinity of the vertex of the first slit section 271, the whole of the three slit sections 271, 272, and 273 are brightened and correspond to the peripheral light distribution area As. Therefore, by using the single condenser lens 12 for both the light sources (21, 22), the vehicle lighting 10 can irradiate the shade 13 with the desired light distribution, and can form the central light distribution area Ac and the peripheral light distribution area As with different light intensity on the shade 13.

Therefore, the vehicle lighting 10 can be simplified compared to conventional vehicle lighting while making the irradiation pattern Pi to be formed a desired brightness distribution. In addition, the vehicle lighting 10 can guide the light from the first light source 21 and the light from the second light source 22 inwardly and outward from the emission surface 32 to collect the light in the single condenser lens 12, so that both the light from the first light source 21 and the light from the second light source 22 can be guided together onto the shade 13. Furthermore, the vehicle lighting 10 irradiates the four areas (A1, A2, A3, A4) that are different in a position, size and light distribution from each other on the shade 13 by utilizing difference of the arears formed by two light paths in the condenser lens 12: one through the curved incident surface section 33 and the inner emission surface section 36, and the other through the annular incident surface section 34, the reflective surface 35, and the outer emission surface section 37, and the different positions of the first light source 21 and the second light source 22 relative to the projected optical axis Lp. Therefore, in the vehicle lighting 10, even when the single condenser lens 12 for both the light sources (21, 22) is used, light distribution on the shade 13 is easily adjusted. From theses, compared to the conventional vehicle lighting, in the vehicle lighting 10, the light distribution in which the central light distribution area Ac and the peripheral light distribution area As are formed on the shade 13 of the vehicle lighting 10 is easily adjusted.

The vehicle lighting 10 of Example 1 can obtain each of the following operational effects.

The vehicle lighting 10 uses the single condenser lens 12 for the two light sources (21, 22), and the incident surface 31 of the condenser lens 12 has the curved incident surface section 33 and the annular incident surface section 34 and the condenser lens 12 has the reflective surface 35. In the vehicle lighting 10, both the light sources are disposed located inside the annular incident surface section 34 viewed in the direction of the projection lens optical axis (projected optical axis Lp), the first light source 21 is located such that the first emitting surface (fluorescent substance 21b) is located on the projection lens optical axis, and the second light source 22 is located such that the second emitting surface (fluorescent substance 22b) does not intersect the projection lens optical axis. Therefore, the vehicle lighting 10 can efficiently utilize the light emitted from both the light sources. Even with the single condenser lens 12, the vehicle lighting 10 can irradiate the four areas (A1, A2, A3, A4) that are different in position, size, and light distribution from each other on the light-shielding member (shade 13) by utilizing the difference between the two light paths therein and the difference in the positions of both the light sources relative to the projection lens optical axis of the condenser lens 12. From this, the vehicle lighting 10 can easily adjust the light distribution on the light-shielding member, and the irradiation pattern Pi to be formed can be made to have a desired brightness distribution.

In the vehicle lighting 10, the inner emission surface section 36 of the emission surface 32 of the condenser lens 12 is optically set as to spread the light through the curved incident surface section 33 in the horizontal direction, and the outer emission surface section 37 of the emission surface 32 is optically set as to as to condense the light from the reflective surface 35 onto the condenser lens optical axis Lc. Therefore, in the two light paths of the condenser lens 12, the vehicle lighting 10 has different optical settings in the emission surface 32 in addition to the difference in light traveling in the incident surface 31, and therefore it is possible to easily adjust the position, the size, and the light distribution in each of the above four areas. In particular, the vehicle lighting 10 of Example 1 is provided with a step between the inner emission surface section 36 and the outer emission surface section 37, and therefore it is possible to easily create optical settings that are different from each other.

In the vehicle lighting 10, the condenser lens optical axis Lc is provided so as to be inclined below the projection lens optical axis (projected optical axis Lp) in the condenser lens 12. Therefore, the vehicle lighting 10 can form a spot of the highest light intensity below the projection lens optical axis on the light-shielding member (shade 13).

The vehicle lighting 10 extends the condenser lens optical axis Lc toward the vicinity of the vertex of the first slit section 271, which is the maximum light intensity spot set in the light-shielding member (shade 13). Therefore, the vehicle lighting 10 can easily brighten the maximum light intensity spot on the light-shielding member while achieving a desired light distribution.

In the vehicle lighting 10, the condenser lens 12 causes the light, emitted from the first light source 21 and having passed through the inner emission surface section 36, to radiate onto the first area A1 that extends horizontally below the projection lens optical axis (projected optical axis Lp) on the light-shielding member (shade 13). In the vehicle lighting 10, the condenser lens 12 causes the light, emitted from the first light source 21 and having passed through the outer emission surface section 37, to radiate onto the second area A2 that is below the projection lens optical axis on the light-shielding member and that has a circular shape horizontally smaller than the first area A1. Furthermore, in the vehicle lighting 10, the condenser lens 12 causes the light, emitted from the second light source 22 and having passed through the inner emission surface section 36, to radiate onto the third area A3 that extends horizontally above the projection lens optical axis on the light-shielding member. In the vehicle lighting 10, the condenser lens 12 causes the light, emitted from the second light source 22 and having passed through the outer emission surface section 37, to radiate onto the fourth area A4 that is below the projection lens optical axis that has a larger circular shape than the second area A2 on the light-shielding member. Therefore, the vehicle lighting 10 radiates the four areas at the same time, so that it is possible to form the central light distribution area Ac, which is centered below the projection lens optical axis, and the peripheral light distribution area As, which surrounds the central light distribution area and reaches above the projection lens optical axis, on the light-shielding member, and the irradiation pattern Pi to be formed can be made to have the desired brightness distribution.

In the vehicle lighting 10, the condenser lens 12 causes the center in the second area A2 to have higher light intensity than any of the first area A1, the third area A3, and the fourth area A4. Therefore, the vehicle lighting 10 can efficiently form the second area A2, that is, the brightest area, because the second area A2 that is formed by the light, emitted from both the light sources (21, 22) through the inner emission surface section 36 and directly travels, and is the smallest area, is the brightest.

In the vehicle lighting 10, the irradiation slit 26 has the far slit section (first slit section 271) corresponding to the far irradiation pattern (first irradiation pattern Di1) of the irradiation pattern Pi and the near slit section (third slit section 273) corresponding to the near irradiation pattern (third irradiation pattern Di3) of the irradiation pattern Pi. In the vehicle lighting 10, the center in the second area A2, which is the brightest (highest light intensity), is the center in the far slit section. Therefore, the vehicle lighting 10 can irradiate the center of the far slit section most brightly, and the center of the far irradiation pattern of the irradiation pattern Pi can be the brightest. In the vehicle lighting 10, the center of the second area A2 coincides with the center of the far slit section and forms the second area A2 in an area larger than the far slit section in the up-down direction, and therefore, for example, even when the center of the far irradiation pattern is misaligned with the center of the second area A2 due to manufacturing errors, the center of the far irradiation pattern can be located in the second area A2, and the brightness of the far irradiation pattern can be secured (the influence of misalignment can be suppressed).

In the vehicle lighting 10, the first light source 21 and the second light source 22 are long in the horizontal direction and parallel in the vertical direction. Therefore, the vehicle lighting 10 can cover a light emission range in the horizontal direction with the long dimensions of both the light sources (21, 22), and cover a light emission range in the vertical direction with both the parallel light sources (21, 22), and utilize a wide range of the light sources. In particular, in the vehicle lighting 10 of Example 1, the two LED chips 21a and 22a are disposed in parallel in the long direction, and therefore desired brightness on the light-shielding member, that is, in the irradiation pattern Pi to be formed can be easily secured. In addition, in the vehicle lighting 10 in Example 1, the interval in the vertical direction of both the light sources ranges from 1.3 mm to approximately 2.0 mm (1.5 mm in Example 1), and therefore the four areas to be formed can be properly overlapped, and the irradiation pattern Pi to be formed can be made to have the desired brightness distribution.

Therefore, the vehicle lighting 10 of Example 1 as the vehicle lighting according to the present disclosure can efficiently utilize light from both the light sources (11, 12) while forming the irradiation pattern Pi with the desired brightness distribution.

While the vehicle lighting of the present disclosure has been described on the basis of Example 1, the specific configuration is not limited to Example 1, and design changes, additions, and the like are permitted as long as they do not depart from the gist of the invention claimed in each claim.

In Example 1, the irradiation pattern Pi is composed of the three irradiation patterns Di, which are V-shaped symbols and are aligned at substantially equal intervals in the direction away from the vehicle 1. However, the irradiation pattern is not limited to the configuration of Example 1, as long as the pattern is formed by the shade (light-shielding member), the position of the design and the shape of the symbols as the irradiation pattern Di and the number of the irradiation patterns Di may be set appropriately. The vehicle lighting 10 is provided in the front section of the vehicle 1 in Example 1, but may be housed in a door mirror, disposed in a light chamber of a headlight or a light chamber of a tail light (light chambers on either side of the rear section of the vehicle), or in a vehicle body, as long as the vehicle lighting 10 is provided in the vehicle 1 in accordance with the position of the irradiation pattern to be formed relative to the vehicle, and the configuration is not limited to that of Example 1.

In Example 1, the first light source 21 and the second light source 22 emit amber-colored light. However, the color of the light emitted from the light sources only needs to be set appropriately according to the location of installation and the content to be conveyed, and is not limited to the configuration of Example 1.

Furthermore, in Example 1, the shade 13 is used as a light-shielding member to allow the light condensed by the condenser lens 12 to pass through the irradiation slit 26. However, the light-shielding member may have other configuration, as long as the light-shielding member is provided with an irradiation slit 26 that partially passes light condensed by the condenser lens 12, and is not limited to the configuration of each example. As another configuration, for example, an irradiation slit that partially transmits light is provided in a plate-like film member that blocks light transmission, so that a light-shielding plate (filter) that transmits, from the irradiation slit, the light which has passed through the condenser lens 12 can be obtained.

In Example 1, the vehicle lighting 10 is provided in the vehicle 1 that is driven by a driver. However, the vehicle lighting may be installed in a vehicle with an automatic driving function, and is not limited to the configuration of Example 1. In this case, the vehicle lighting is not limited to the configuration of Example 1, as long as the irradiation pattern is formed at a timing according to the application for which the vehicle lighting is provided, that is, according to some intention regarding the operation of the vehicle 1.

In Example 1, the light source section 11 is provided on the installation base section 16 that functions as a heat sink, and the installation base section 16 is connected to the housing 15. However, as long as light from light sources is condensed on a light-shielding member by a condenser lens and projected by a projection lens to form an irradiation pattern, a light source section may be provided on an end of a housing, or other configuration may be employed, and the vehicle lighting is not limited to the configuration of Example 1.

In Example 1, a step is provided on the emission surface 32 of the condenser lens 12 between the inner emission surface section 36 and the outer emission surface section 37. However, the vehicle lighting does not need to have the step between the inner emission surface section 36 and the outer emission surface section 37 on the emission surface 32, but may have a uniform optical characteristic, and the vehicle lighting is not limited to the configuration of Example 1. Herein, when the condenser lens has no step between the inner emission surface section and the outer emission surface section, light can be utilized more efficiently because the step can prevent light directed to the vicinity of the boundary between the inner emission surface section and the outer emission surface section from being refracted or reflected and traveling in an unintended direction.

In Example 1, the respective light sources (21, 22) have the two LED chips 21a and the two LED chips 22a, each in parallel, and the fluorescent substances 21b and 22b that cover the LED chips 21a and LED chips 22a, respectively. However, as long as the respective light sources are disposed inside the annular incident surface section of the incident surface of the condenser lens as viewed in the projection lens optical axis direction, and the first emitting surface of the first light source is located on the projection lens optical axis and the second light source 22 is located such that the second emitting surface (fluorescent substance 22b) does not intersect the projection lens optical axis, the respective configurations may be set as needed and are not limited to the configuration of Example 1.

In Example 1, the condenser lens 12 is provided such that the condenser lens optical axis Lc is inclined below the projection lens optical axis (projected optical axis Lp). However, as long as the condenser lens has an incident surface with a curved incident surface section and an annular incident surface section and also has a reflective surface surrounding the curved incident surface section and the annular incident surface section, the positional relationship of the condenser lens optical axis to the projection lens optical axis can be set appropriately, and the condenser lens is not limited to the configuration in Example 1.

DESCRIPTION OF REFERENCE NUMERALS 10 vehicle lighting
12 condenser lens
13 shade (as an example of a light-shielding member)
14 projection lens
21 first light source
21b fluorescent substance (as an example of a first emitting surface)
22 second light source
22b fluorescent substance (as an example of a second emitting surface)
26 irradiation slit
271 first slit section (as an example of a far slit section)
273 third slit section (as an example of a near slit section)
31 incident surface
32 emission surface
33 curved incident surface section
34 annular incident surface section
35 reflective surface
36 inner emission surface section
37 outer emission surface section
A1 first area A2 second area
A3 third area
A4 fourth area
Di1 first irradiation pattern (as an example of a far irradiation pattern)
Di3 third irradiation pattern (as an example of a near irradiation pattern)
Lc condenser lens optical axis
Lp projected optical axis (as an example of a projection lens optical axis)
Pi irradiation pattern

The invention claimed is:

1. Vehicle lighting comprising:
a first light source and a second light source disposed in parallel;
a condenser lens that allows light from each of the first light source and the second light source to enter from an incident surface, and emits and condenses the light from an emission surface;
a light-shielding member provided with an irradiation slit through which the light condensed by the condenser lens partially passes; and
a projection lens that projects the light which has passed through the light-shielding member, and forms an irradiation pattern, wherein
the incident surface has a curved incident surface section facing the first light source and the second light source in a condenser lens optical axis direction in the condenser lens, and an annular incident surface section that surrounds the curved incident surface section,
the condenser lens has a reflective surface that surrounds the curved incident surface section,
the first light source is disposed such that a first emitting surface is located on a projection lens optical axis of the projection lens, and
the second light source is disposed inside the annular incident surface section as viewed in a direction of the projection lens optical axis such that a second emitting surface does not intersect the projection lens optical axis.

2. The vehicle lighting according to claim 1, wherein
the emission surface has an inner emission surface section provided on the condenser lens optical axis and corresponding to the curved incident surface section, and an outer emission surface section provided so as to surround the inner emission surface section and corresponding to the reflective surface,
the inner emission surface section spreads, in a horizontal direction, light which has passed through the curved incident surface section, and
the outer emission surface section condenses light from the reflective surface onto the condenser lens optical axis.

3. The vehicle lighting according to claim 2, wherein
the condenser lens is provided such that the condenser lens optical axis is inclined below the projection lens optical axis.

4. The vehicle lighting according to claim 3, wherein
the condenser lens optical axis extends toward a maximum light intensity spot set in the light-shielding member.

5. The vehicle lighting according to claim 2, wherein
the condenser lens causes light, emitted from the first light source and having passed through the inner emission surface section, to radiate onto a first area that extends in a horizontal direction below the projection lens optical axis on the light-shielding member,
the condenser lens causes light, emitted from the first light source and having passed through the outer emission surface section, to radiate onto a second area that is below the projection lens optical axis on the light-shielding member and that has a circular shape horizontally smaller than the first area,
the condenser lens causes light, emitted from the second light source and having passed through the inner emission surface section, to radiate onto a third area that extends in the horizontal direction above the projection lens optical axis on the light-shielding member, and
the condenser lens causes light, emitted from the second light source and having passed through the outer emission surface section, to radiate onto a fourth area that has a larger circular shape than the second area below the projection lens optical axis on the light-shielding member.

6. The vehicle lighting according to claim 5, wherein
the condenser lens causes a center in the second area to have higher light intensity than any position of the first area, the third area, and the fourth area.

7. The vehicle lighting according to claim 6, wherein
the irradiation slit has a far slit section corresponding to a far irradiation pattern projected at a far position in the irradiation pattern, and a near slit section corresponding to a near irradiation pattern projected at a near position in the irradiation pattern, and
the center in the second area is a center in the far slit section.

8. The vehicle lighting according to claim 1, wherein
the first light source and the second light source are long in a horizontal direction, and are disposed in parallel in a vertical direction.

9. Vehicle lighting comprising:
a first light source and a second light source disposed in parallel;
a condenser lens that allows light from each of the first light source and the second light source to enter from an incident surface, and emits and condenses the light from an emission surface;
a light-shielding member provided with an irradiation slit through which the light condensed by the condenser lens partially passes; and
a projection lens that projects the light which has passed through the light-shielding member, and forms an irradiation pattern, wherein
the incident surface has a curved incident surface section facing the first light source and the second light source in a condenser lens optical axis direction in the condenser lens, and an annular incident surface section that surrounds the curved incident surface section, and
the condenser lens has a reflective surface that surrounds the curved incident surface section, and is provided such that the condenser lens optical axis is inclined below the projection lens optical axis.

* * * * *